United States Patent [19]

Someya et al.

[11] Patent Number: 4,795,926
[45] Date of Patent: Jan. 3, 1989

[54] MOTOR END BEARINGS ACCOMMODATING INCREASED SHAFT LENGTHS

[75] Inventors: Ryoichi Someya; Masakazu Ikegami, both of Matsudo, Japan

[73] Assignee: Mabuchi Motor Co. Ltd., Japan

[21] Appl. No.: 75,604

[22] Filed: Jul. 20, 1987

[30] Foreign Application Priority Data

Aug. 5, 1986 [JP] Japan .................. 61-120215[U]

[51] Int. Cl.⁴ .............................................. H02K 5/16
[52] U.S. Cl. ........................................ 310/90; 384/439
[58] Field of Search .................... 310/90, 89, 42; 384/420, 424, 439

[56] References Cited

U.S. PATENT DOCUMENTS 4,007,390  2/1977  Muller et al. ................. 310/90
4,480,881 11/1984  Fujimori ....................... 310/90
4,559,461 12/1985  Takahashi et al. ........... 310/90

Primary Examiner—Peter S. Wong
Assistant Examiner—D. L. Rebsch
Attorney, Agent, or Firm—McGlew and Tuttle

[57] ABSTRACT

A motor having a housing comprising a case and a case cover, and bearings for supporting a motor rotating shaft fitted to the case and the case cover, respectively. The bearings are secured to the case and include a large diameter portion at one axial end having a diameter larger than the diameter of a bearing mounting hole in the case. The bearings also include a small diameter portion, provided at the other end thereof, which is extended continuously from the large diameter portion via a shoulder having such a diameter as to be fitted into the bearing mounting hole in the case. A recess is provided on the end face of the small diameter portion so as to permit a substantial increase the distance 1 between the bearings.

4 Claims, 3 Drawing Sheets

MOTOR END BEARINGS ACCOMMODATING INCREASED SHAFT LENGTHS

BACKGROUND OF THE INVENTION

This invention relates generally to a motor, and more particularly to a motor having a bearing secured to a case that has a circular recess which is concentric with a shaft hole and is provided on the bearing end face, facing toward the inside of the bearing, so as to increase the distance between the bearings and prevent bearing fastening force from causing deformation on the bearing inside diameter.

DESCRIPTION OF THE PRIOR ART

FIG. 5 shows a motor of a conventional type with stator magnet 6, rotor 7 and commutator 8. The rotating shaft 5 is supported by the bearing 1 engaged to a recess on the case cover 4 and the bearing 2' fitted to the case 3. L' is the distance between the bearings 1 and 2'. FIG. 6 is a partially cross-sectional enlarged view of a portion at which the bearing 2' is mounted. FIG. 7 is a partially cross-sectional side elevation of the bearing 2', and FIG. 8 is a perspective view of the bearing 2'.

As is apparent from FIGS. 7 and 8, the bearing 2' consists of a large-diameter portion 20, at one end thereof in the axial direction, having a diameter larger than the diameter of the bearing mounting hole 15 on the case 3, and a small-diameter portion 21, at the other end thereof, which is continuously extended from the large-diameter portion 20 via a shoulder. At the center of the bearing 2', provided is a shaft hole 22 through which the rotating shaft 5 is passed. The bearing 2' is fitted to the case 3 by inserting the small-diameter portion 21 into the bearing mounting hole 15 on the case 3 until the large-diameter portion 20 comes in contact with the case 3, and staking the peripheral portion of the end face of the small-diameter portion 21. In FIG. 6, the portion 14 indicates a flattened end flange or collar portion. Numerals 12 and 13 designate an adjusting washer and a rotor bushing fitted to the rotating shaft 5, respectively.

In recent years, requirements for motors have been increasingly stringent and demanding; such as improved performance with the external dimensions unchanged, reduced external dimensions without sacrificing performance, or improved performance with reduced external size.

One of the dimensional elements associated with improved motor performance is the distance between two bearings supporting the rotating shaft. This is because the longer the distance between the bearings, the longer rotor is allowed to be fitted, resulting in improved motor performance. However, when a bearing of the type that is secured to the case 3 is used, as with the aforementioned conventional type of motor, at least the portion 14 needed to be secured has to be extended toward the inside of the case 3 (toward the right side in FIG. 6). Symbol d indicates the protruded length of the bearing 2' toward the inside of the case 3. This inevitably reduces the distance L' between the bearings 1 and 2' by the extended length d, compared with the coresponding distance in a cylindrical sintered oil-impregnated bearing 2" in which the inside surface of the case 3 is made flush with the end face of the bearing 2", as shown in FIG. 9.

When fitting the bearing 2' to the case 3, a crimping force is applied to the peripheral portion of the end face of the small-diameter portion 21. The crimping force, however, tends to have a distorting effect on the shaft hole 22, which is provided at the center of the end face of the bearing, flush with the peripheral portion of the small-diameter portion end face. This could result in deformation in the inside diameter of the shaft hole 22.

SUMMARY OF THE INVENTION

This invention is intended to overcome the aforementioned problems encountered with a motor having a bearing of a type that is staked to a motor case.

It is the first object of this invention to provide a motor in which a bearing of the type that is staked to a case consists of a large-diameter portion, at one end thereof, having a diameter larger than the diameter of a bearing mounting hole on the case, and a small-diameter portion, at the other end thereof, which is extended continuously from the large-diameter portion via a shoulder and having such a diameter as to be fitted into the bearing mounting hole on the case; and a circular recess, concentric with the shaft hole, is provided on the end face of the small-diameter portion so as to substantially increase the distance between the bearings.

It is the second object of this invention to provide a motor in which the bearing is staked to the case at the peripheral portion of the small-diameter portion without causing deformation in the inside diameter of the bearing.

DETAILED DESCRIPTION OF THE EMBODIMENT

Figure 1:
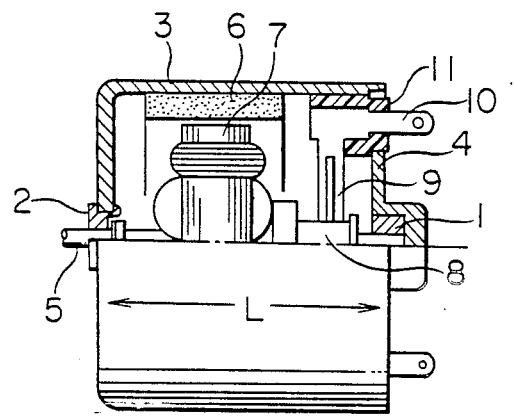
FIG. 1 is a partially cross-sectional side elevation of a motor embodying this invention.
Figure 2:
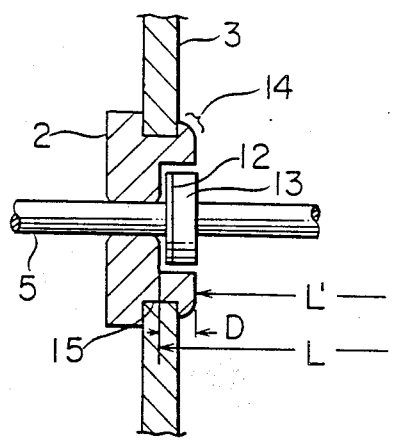
FIG. 2 is a cross-sectional enlarged view of a portion at which a bearing is mounted in an embodiment of this invention.
Figure 3:
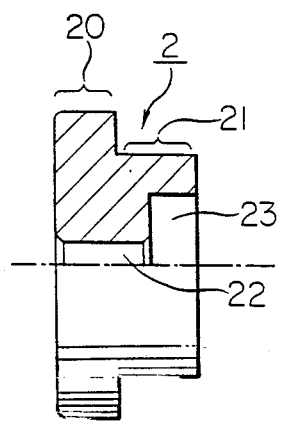
FIG. 3 is a partially cross-sectional side elevation of a bearing used in this invention.
Figure 4:
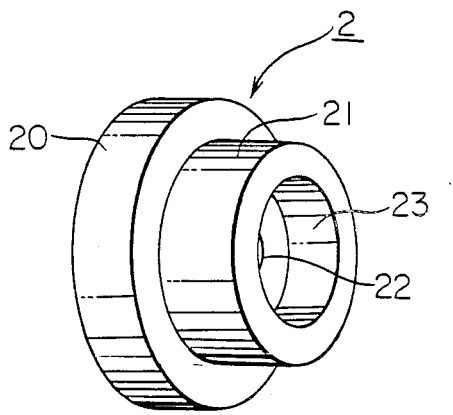
FIG. 4 is a perspective view of a bearing used in this invention.
Figure 5:
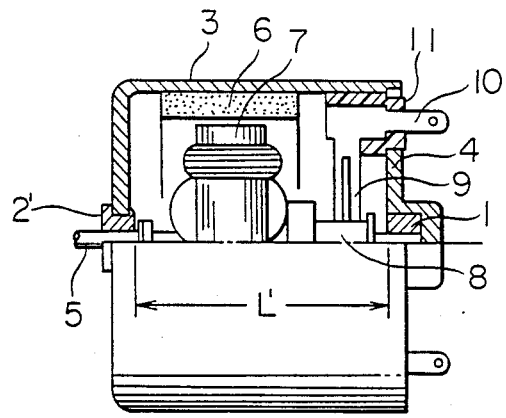
FIG. 5 is a partially cross-sectional side elevation of a motor of the conventional type.
Figure 6:
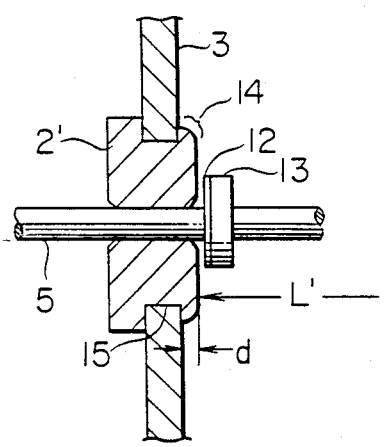
FIG. 6 is a cross-sectional enlarged view of a portion at which a bearing is mounted in a motor of the conventioanl type.
Figure 7:
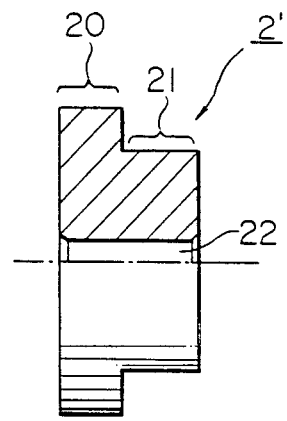
FIG. 7 is a partially cross-sectional side elevation of a bearing used in the conventional type motor.
Figure 8:
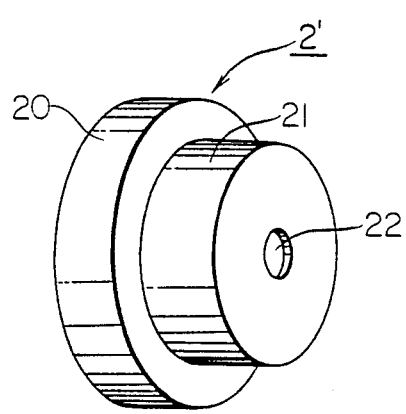
FIG. 8 is a perspective view of a bearing used in the conventional type motor.
Figure 9:
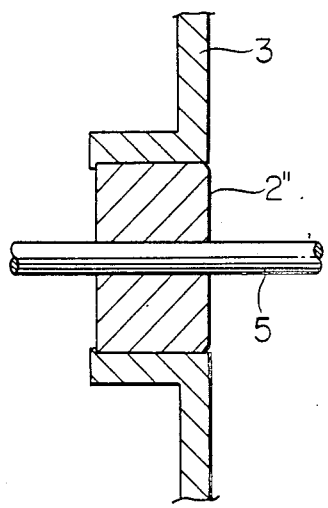
FIG. 9 is a cross-sectional view of a portion at which a cylindrical sintered oil-impregnated bearing is installed.

That the bearing 2 has the large-diameter portion 20, the small-diameter portion 21 and the shaft hole 22 is essentially the same as with the conventional type motor, except that the circular recess 23 (FIGS. 1-4), concentric with the shaft hole 22, is provided. The bearing 2 is fitted to the case 3 by engaging the small-diameter portion 21 with the bearing mounting hole 15. And, after the large-diameter portion 20 comes into contact with the case 3, the peripheral portion of the end face of the small-diameter portion 21 is crimped. The portion having numeral 14 denotes the staked portion or collar. By making the diameter of the recess 23 larger than the diameters of shaft positioning means in the form of an adjusting washer 12 and a rotor bushing 13 fitted to the rotating shaft 5 which prevent axial shifting of the shaft. The adjusting washer 12 and the rotor bushing 13 are allowed to be housed in the recess 23, as shown in FIG. 2. That is, the depth D of the recess 23 serves as part of the distance between the inner ends of recess 23 of the bearings 1 and 2. Consequently, the distance between the bearings that has heretofore been limited to L' can be increased by D to a length of L measured to the interiors of the recess 23 without changing the size of the case 3, or without changing the outside dimensions of the motor.

Although the depth D of the recess 23 can be determined appropriately as necessary, it is desirable to make the inside wall surface of the case 3 coincide with the bottom surface of the recess 23.

As described above, this invention makes it possible to increase the distance between the bearings without changing the external dimensions of the motor, thereby allowing the motor to have a longer rotor. This leads to improved motor performance without changing the external dimensions of the motor.

Since the ring-shaped end portion between the outside surface of the small-diameter portion 21 and the inner circumferential surface of the recess 23 is separated from the shaft hole 22 by the shoulder, the crimping force exerted on the end portion during the crimping of the bearing to the case has no adverse effect on the shaft hole 22, causing no deformation on the shaft hole 22. Thus, the shaft hole 22, which is a portion coming in sliding contact with the rotating shaft 5 is maintained dimensionally stable.

What is claimed is:

1. A motor, comprising a closed case housing having spaced apart end walls with respective shaft receiving openings, a shaft bearing having a large diameter portion engaged against the exterior of each of said walls, a small diameter portion extending through said opening of a diameter smaller than the diameter of said large diameter portion and with an inner end forming a collar engaged against the associated interior of a respective end wall, a recess defined on the interior of said small diameter portion extending around said shaft, and adjusting washer and bushing means secured to said shaft and accommodated within said recess.

2. A motor according to claim 1 wherein said adjusting washer and bushing means comprises a disc-shaped rotor bushing engaged on said shaft and an adjustable washer between said bushing and the interior of said recess, said bushing and washer fitting entirely within said recess.

3. A motor according to claim 1, wherein the recesses of a circular recess are concentric with said shaft hole and said shaft and said adjusting washer and bushing means.

4. A motor according to claim 1, wherein the interior of said small diameter portion of said bearing is crimped inwardly toward the adjacent wall to form a collar preventing removal of said bushing from said casing.

* * * * *